US010652410B2

(12) United States Patent
Hamada

(10) Patent No.: US 10,652,410 B2
(45) Date of Patent: May 12, 2020

(54) INFORMATION PROCESSING APPARATUS, IMAGE PROCESSING APPARATUS, AND NON-TRANSITORY COMPUTER READABLE MEDIUM

(71) Applicant: FUJI XEROX CO., LTD., Tokyo (JP)

(72) Inventor: Makoto Hamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/690,669

(22) Filed: Aug. 30, 2017

(65) Prior Publication Data

US 2018/0213094 A1 Jul. 26, 2018

(30) Foreign Application Priority Data

Jan. 26, 2017 (JP) .................................. 2017-012282

(51) Int. Cl.
*G06F 3/12* (2006.01)
*H04N 1/00* (2006.01)
(52) U.S. Cl.
CPC ..... *H04N 1/00389* (2013.01); *H04N 1/00411* (2013.01); *H04N 2201/0094* (2013.01)
(58) Field of Classification Search
None
See application file for complete search history.

(56) References Cited

U.S. PATENT DOCUMENTS

| 2005/0146731 A1* | 7/2005 | Mitani | H04N 1/00408 |
| | | | 358/1.1 |
| 2006/0055783 A1* | 3/2006 | Kawamura | H04N 1/00384 |
| | | | 348/207.2 |
| 2009/0080029 A1* | 3/2009 | Vendrow | H04N 1/00212 |
| | | | 358/402 |
| 2010/0134826 A1* | 6/2010 | Ishigure | H04N 1/0035 |
| | | | 358/1.15 |
| 2012/0260350 A1* | 10/2012 | Yamada | H04N 1/00411 |
| | | | 726/28 |
| 2014/0362409 A1* | 12/2014 | Kikuchi | G06F 3/1222 |
| | | | 358/1.15 |
| 2016/0295033 A1* | 10/2016 | Hirasawa | H04N 1/0097 |
| 2017/0161712 A1* | 6/2017 | Ohtsu | G06Q 20/208 |
| 2018/0039464 A1* | 2/2018 | Nobutani | H04N 1/442 |

FOREIGN PATENT DOCUMENTS

JP 2014-048805 A 3/2014

\* cited by examiner

*Primary Examiner* — Huo Long Chen
(74) *Attorney, Agent, or Firm* — Oliff PLC

(57) ABSTRACT

An information processing apparatus includes a display and a processing execution unit. The display displays an operator for receiving an instruction to execute predetermined processing. At least part of information concerning the predetermined processing is not appended to the operator. When the operator is selected by a user, the processing execution unit starts to display associated information associated with the operator, continues to display the associated information for a predetermined time, and then executes the predetermined processing.

10 Claims, 8 Drawing Sheets

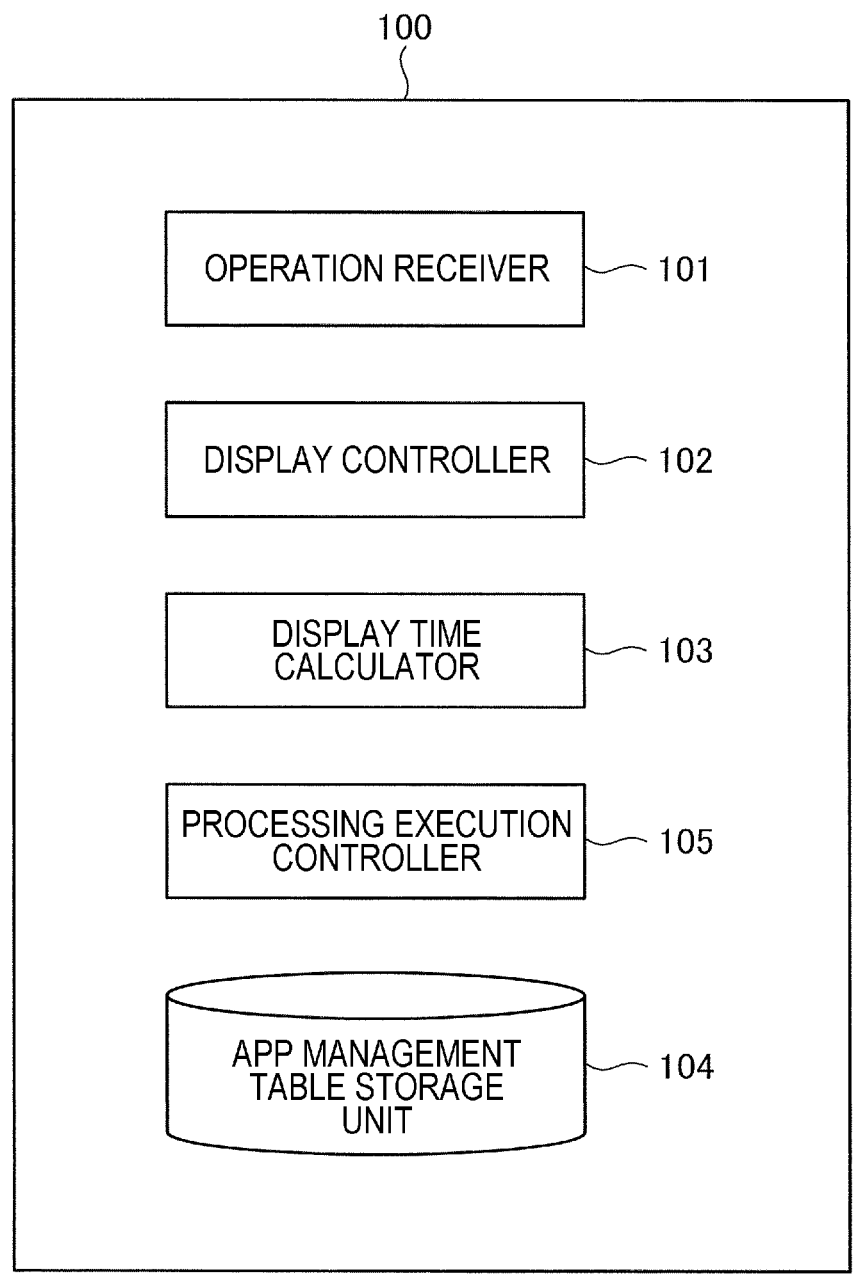

FIG. 4A

| NAME | PROCESSING CONTENT | APPLICATION TYPE | APP ID |
|---|---|---|---|
| Copy | COPY | STANDARD APP | 1 |
| FAX | FAX | STANDARD APP | 2 |
| Scan To | SCAN | STANDARD APP | 3 |
| John's Copy | COPY | ONE TOUCH APP | 11 |
| ID Card Copy | COPY | STANDARD APP | 4 |

FIG. 4B

| NAME | SETTING ITEMS | | APP DISPLAY TIME | PARENT APP ID |
|---|---|---|---|---|
| John's Copy | COLOR MODE | MONOCHROME | 10 SECONDS | 1 |
| | DOUBLE-SIDED/ SINGLE-SIDED | SINGLE-SIDED | | |
| | TRAY NUMBER | BYPASS TRAY | | |
| | NUMBER OF COPIES | 1 | | |
| | ENLARGEMENT/ REDUCTION | 100% | | |
| | SHEET SIZE | A3 | | |

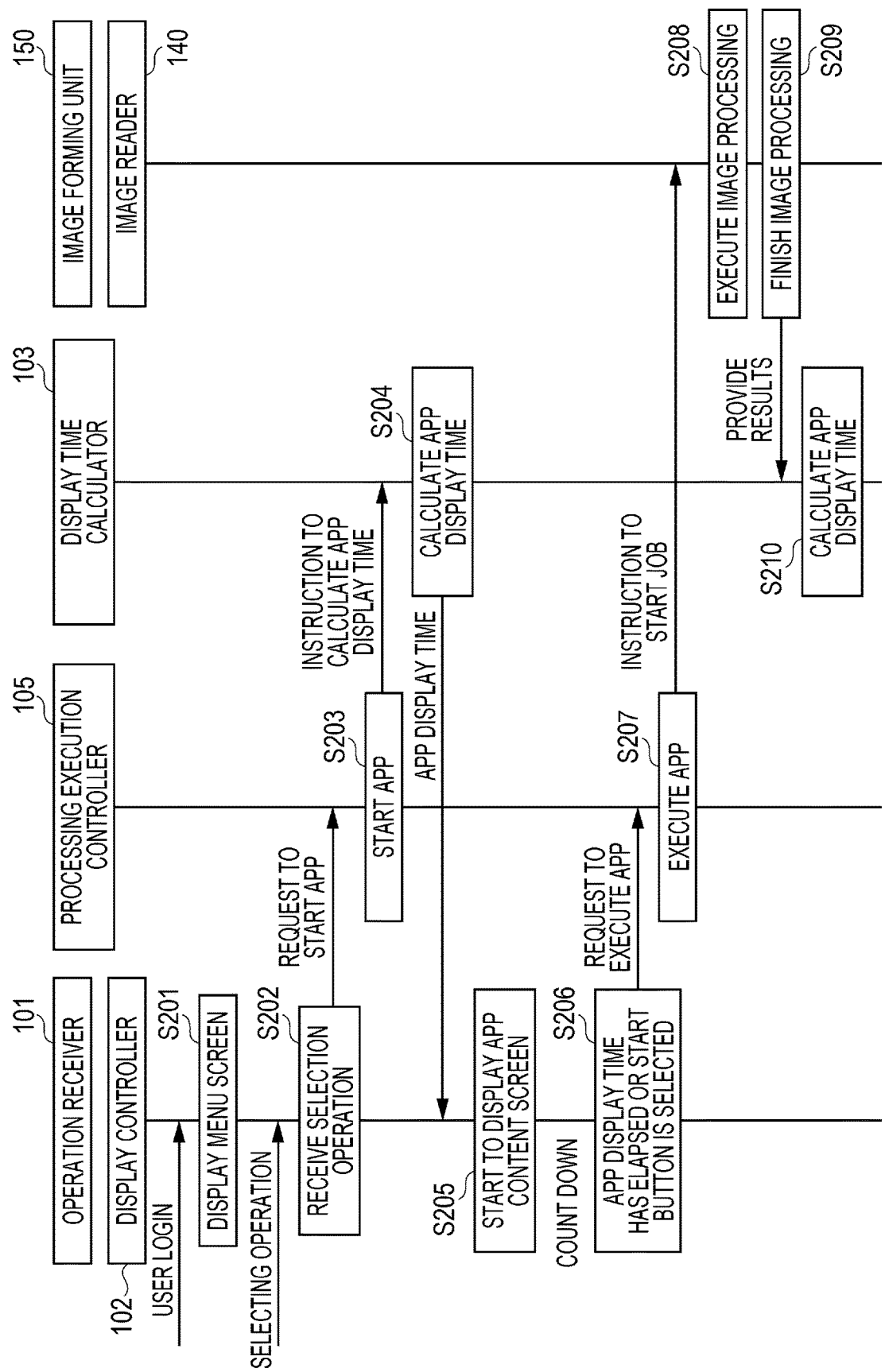

INFORMATION PROCESSING APPARATUS, IMAGE PROCESSING APPARATUS, AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2017-012282 filed Jan. 26, 2017.

BACKGROUND

Technical Field

The present invention relates to an information processing apparatus, an image processing apparatus, and a non-transitory computer readable medium.

SUMMARY

According to an aspect of the invention, there is provided an information processing apparatus including a display and a processing execution unit. The display displays an operator for receiving an instruction to execute predetermined processing. At least part of information concerning the predetermined processing is not appended to the operator. When the operator is selected by a user, the processing execution unit starts to display associated information associated with the operator, continues to display the associated information for a predetermined time, and then executes the predetermined processing.

BRIEF DESCRIPTION OF THE DRAWINGS

An exemplary embodiment of the present invention will be described in detail based on the following figures, wherein:

FIG. 3 is a block diagram illustrating an example of the functional configuration of the image processing apparatus according to the exemplary embodiment;

FIGS. 4A and 4B illustrate examples of items of information included in an app management table;

FIG. 6 is a sequence chart illustrating an example of the execution procedure of a one touch app;

DETAILED DESCRIPTION

An exemplary embodiment of the invention will be described below in detail with reference to the accompanying drawings.

(Hardware Configuration of Image Processing Apparatus)

An example of the hardware configuration of an image processing apparatus 100 according to the exemplary embodiment will first be discussed below with reference to the block diagram of FIG. 1. The image processing apparatus 100 is a so-called multifunction device having various image processing functions, such as an image reading function (scan function), a print function (printer function), a copy function, and a fax sending and receiving function.

Figure 1:
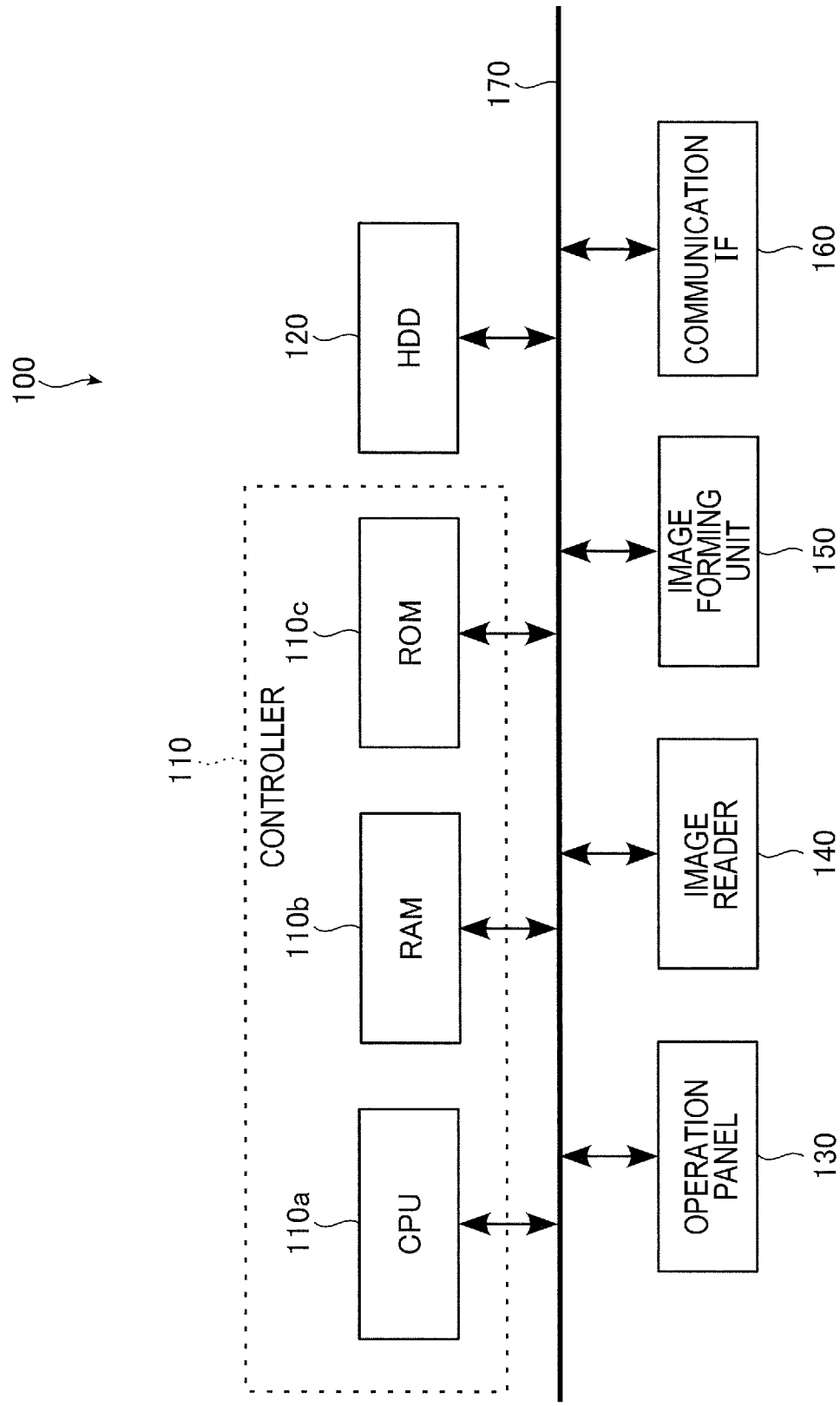
FIG. 1 is a block diagram illustrating an example of the hardware configuration of an image processing apparatus according to the exemplary embodiment.

As shown in FIG. 1, the image processing apparatus 100 includes a controller 110, a hard disk drive (HDD) 120, an operation panel 130, an image reader 140, an image forming unit 150, and a communication interface (hereinafter called the "communication IF") 160. These elements are connected to a bus 170 and send and receive data to and from each other via the bus 170. In this exemplary embodiment, the image processing apparatus 100 is an example of an information processing apparatus and an image processing apparatus.

The controller 110 controls operations of the individual elements of the image processing apparatus 100. The controller 110 includes a central processing unit (CPU) 110a, a random access memory (RAM) 110b, and a read only memory (ROM) 110c.

The CPU 110a loads various programs stored in the ROM 110c into the RAM 110b and executes the loaded programs so as to implement the functions of the image processing apparatus 100. The RAM 110b is a memory (storage unit) used as a work memory, for example, for the CPU 110a. The ROM 110c is a memory (storage unit) which stores various programs executed by the CPU 110a.

The HDD 120 is a storage unit which stores various items of data. In the HDD 120, image data generated as a result of the image reader 140 reading images and image data received by the communication IF 160 from external sources are stored.

The operation panel 130 displays various items of information and also receives operations from a user to use various functions. An example of the operation panel 130 is a touch panel display.

The image reader 140 reads an image recorded on a recording material, such as a sheet, to generate data indicating a read image (image data). The image reader 140 is a scanner, for example, and is a charge coupled device (CCD) scanner or a contact image sensor (CIS) scanner. In a CCD scanner, light applied to a document from a light source and reflected by the document is reduced by a lens and is received by CCDs. In a CIS scanner, light sequentially applied to a document from light emitting diode (LED) light sources and reflected by the document is received by a CIS.

The image forming unit 150 is an example of a print mechanism which forms an image on a recording material, such as a sheet. The image forming unit 150 is a printer, for example, for forming an image based on an electrophotographic system or an inkjet method. In the electrophotographic system, an image is formed by transferring toner attached to a photoconductor drum to a recording material, such as a sheet. In the inkjet method, an image is formed by ejecting ink onto a recording material.

The communication IF 160 sends and receives various items of data to and from other apparatuses via a network, which is not shown.

In the image processing apparatus 100, under the control of the controller 110, the image reader 140 performs the scan function, the image forming unit 150 performs the printer function, the image reader 140 and the image forming unit 150 perform the copy function, and the image reader 140, the image forming unit 150, and the communication IF 160 perform the fax sending function. In this exemplary embodiment, the image reader 140, the image forming unit 150, and the communication IF 160 are an example of an image processor.

(Display Example of Menu Screen)

An example of a menu screen (home screen) 21 displayed on the operation panel 130 will now be discussed below with reference to FIG. 2. The menu screen 21 is displayed as a result of a user inputting his or her user ID and password and logging in, for example.

Plural selection buttons (operators) 22 are displayed on the menu screen 21. As a result of a user selecting (pressing) one of the selection buttons 22, the application associated with the selected selection button 22 is executed. An example of the selecting operation for a selection button 22 is a single-tapping operation on the selection button 22. This operation is performed as a result of a user touching the screen with a finger and releasing the finger within a predetermined time.

Figure 2:
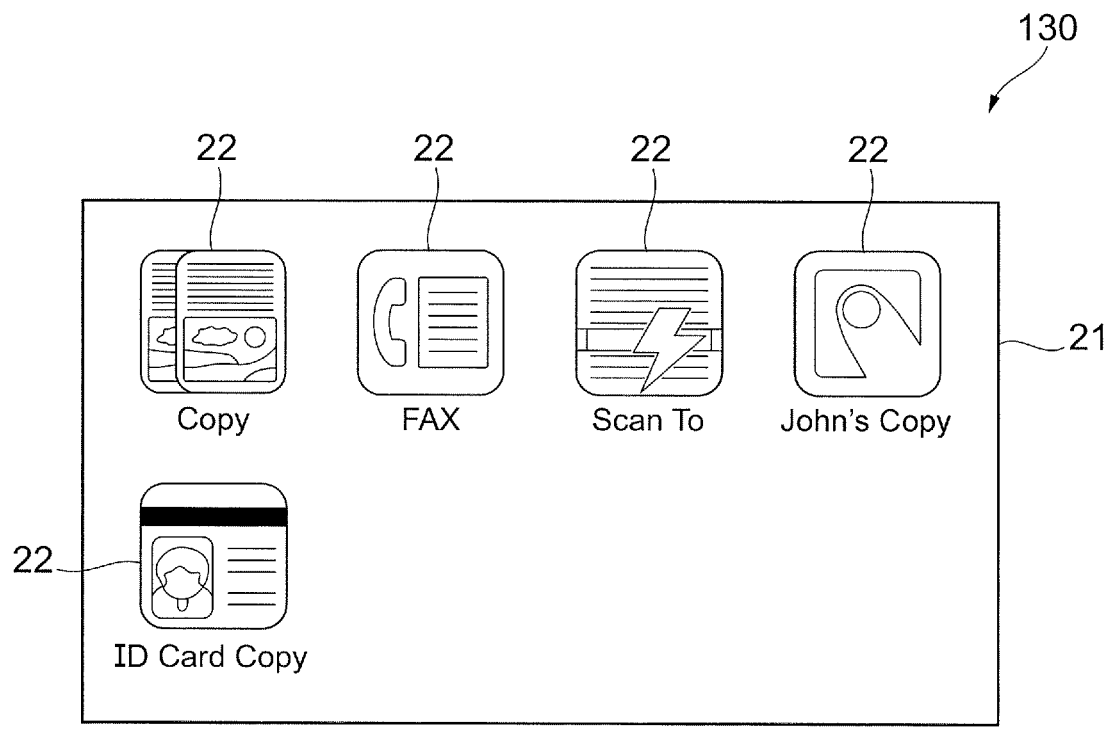
FIG. 2 illustrates an example of a menu screen displayed on an operation panel.

In the example shown in FIG. 2, five selection buttons 22, that is, "Copy", "FAX", "Scan To", "John's Copy", and "ID Card Copy", are displayed. On the menu screen 21 shown in FIG. 2, hidden selection buttons 22 (which are not displayed on the operation panel 130) can also be displayed as a result of a user scrolling the screen in the top-down direction or the right-left direction in FIG. 2. In this exemplary embodiment, the selection buttons 22 include standard selection buttons 22 and one touch selection buttons 22.

A standard selection button 22 is a button associated with predetermined processing (image processing) performed in the image processing apparatus 100. When a user selects a standard selection button 22, a screen for setting detailed settings for the predetermined processing is displayed. The user sets detailed settings on the screen and selects a predetermined button, such as a start button. Then, the predetermined processing, such as copying, associated with this standard selection button 22 is started.

Standard selection buttons 22 have been set in the image processing apparatus 100 in advance. In the example shown in FIG. 2, the selection buttons 22, "Copy", "FAX", "Scan To", and "ID Card Copy", are standard selection buttons 22.

Hereinafter, an application executed upon selecting a standard selection button 22 may be called a "standard app". In other words, a standard app is an application associated with a standard selection button 22. A standard app may be considered as the following type of application. When a user starts a standard app, a screen for setting detailed settings is displayed, and upon receiving settings set by the user, predetermined processing is executed in the image processing apparatus 100 based on these settings.

In contrast, the one touch selection button 22 is a selection button 22 created as a result of a user setting specific settings based on a standard selection button 22. When the user selects a one touch selection button 22 by performing only one input operation, predetermined processing, such as copying, is started with specific settings associated with this one touch selection button 22. The one touch selection button 22 is a selection button 22 which enables a user to execute predetermined processing by performing only one selecting operation. That is, the one touch selection button 22 is a selection button 22 in which multiple operations are integrated into a single operation. In the example shown in FIG. 2, the selection button 22 "John's Copy" is a one touch selection button 22 created based on the standard selection button 22 "Copy".

The one touch selection button 22 is a selection button 22 associated with specific settings for predetermined processing associated with a standard selection button 22. In other words, the one touch selection button 22 is a selection button 22 that enables a user to perform processing associated with a standard selection button 22 with specific settings. Specific settings are settings set for various items (parameters) for executing predetermined processing.

Hereinafter, an application executed upon selecting a one touch selection button 22 may be called a "one touch app". In other words, a one touch app is an application associated with a one touch selection button 22. A one touch app may be considered as an application for executing predetermined processing in the image processing apparatus 100 as a result of a user selecting a corresponding one touch selection button 22 by performing only one input operation.

A one touch app is an application created based on a standard app. Thus, a standard app, based on which a one touch app is created, may be called a "parent app", and the created one touch app may be called a "child app".

In the image processing apparatus 100 of this exemplary embodiment, when a one touch selection button 22 is selected by a user, a screen showing the content of a one touch app associated with the selected one touch selection button 22 is displayed. After the lapse of a predetermined time (ten seconds, for example) after this screen is displayed, the screen automatically disappears without a user performing any operation, and processing of this one touch app is executed. Details of this operation will be discussed later.

Hereinafter, the screen showing the content of a one touch app may be called an "app content screen", and the period of time for which the app content screen is displayed may be called an "app display time". In this exemplary embodiment, the app content screen (information displayed on the app content screen) is used as an example of associated information and information concerning multiple operations integrated into one operation, and the app display time is used as an example of a predetermined time.

(Functional Configuration of Image Processing Apparatus)

An example of the functional configuration of the image processing apparatus 100 according to the exemplary embodiment will be described below with reference to the block diagram of FIG. 3. As shown in FIG. 3, the image processing apparatus 100 includes an operation receiver 101, a display controller 102, a display time calculator 103, an app management table storage unit 104, and a processing execution controller 105.

The operation receiver 101 receives input of an operation from a user. More specifically, the operation receiver 101 receives input of an operation from a user by detecting the user touching the operation panel 130. For example, the operation receiver 101 receives input of a single-tapping operation for selecting a one touch selection button 22 displayed on the operation panel 130.

The display controller 102 generates a control signal to control the displaying of the operation panel 130. The display controller 102 controls the displaying of the operation panel 130 based on the input operation received by the operation receiver 101. For example, if the operation receiver 101 receives a single-tapping operation for selecting a one touch selection button 22, the display controller 102 displays an app content screen of a one touch app associated with this one touch selection button 22 on the operation panel 130. Items of information (parameters) to be displayed on the app content screen for each one touch app are selected by a user in advance.

The display time calculator 103 calculates an app display time for each one touch app (that is, for each one touch selection button 22). The app display time may be calculated based on various items of information. Examples of items of information used for calculating the app display time are the content of processing to be executed by a one touch app, the situation where a one touch app has been used (usage history), and information concerning a user using a one touch app. Details of the calculation procedures for the app display time will be discussed later.

The app management table storage unit 104 stores a table indicating information concerning applications associated with the selection buttons 22. Hereinafter, this table will be called an app management table. In the app management table, information concerning the content of processing executed by an application, for example, is recorded for each application. Regarding one touch apps, information concerning the app display time, for example, is also recorded. Details of the app management table will be discussed later.

The processing execution controller 105 performs control so that processing of an application associated with a selection button 22 will be executed. For example, if a one touch selection button 22 is selected, the processing execution controller 105 performs control so that a one touch app associated with this one touch selection button 22 will be executed after the lapse of the app display time after the app content screen has been displayed. More specifically, if a one touch selection button 22 for copying is selected, the processing execution controller 105 controls the image reader 140 and the image forming unit 150 and causes them to execute copy processing with specific settings after the lapse of the app display time after the app content screen has been displayed.

The functions of the image processing apparatus 100 shown in FIG. 3 are implemented as a result of software and hardware resources operating together. More specifically, if the image processing apparatus 100 is formed by the hardware configuration shown in FIG. 1, as a result of the CPU 110*a* reading an operating system (OS) program and an application program stored in the ROM 110*c* into the RAM 110*b* and executing them, the functions of the operation receiver 101, the display controller 102, the display time calculator 103, and the processing execution controller 105 are implemented. The app management table storage unit 104 is implemented by a storage unit, such as the HDD 120.

In this exemplary embodiment, the display controller 102 is used as an example of a display and first and second displays. The processing execution controller 105 is used as an example of a processing execution unit.

(Calculation Procedures for App Display Time)

The calculation procedures for the app display time will be discussed below in detail.

The display time calculator 103 first calculates the initial value of the app display time, based on various items of information. The initial value is the value of the app display time used for executing a one touch app for the first time after it has been created. When the one touch app is executed for the second or subsequent time, the app display time is calculated by adding or subtracting a certain value to and from the initial value, based on various items of information.

The initial value of the app display time may be calculated based on the content of processing to be executed by a one touch app or information concerning a user using this one touch app.

Calculating of the initial value based on the content of processing to be executed by a one touch app will first be discussed.

The initial value is calculated based on the content of processing, such as fax sending, scanning, copying, or printing.

In the case of fax sending or scanning, for example, data is sent from the image processing apparatus 100 to another apparatus. The user is thus required to pay attention not to send data to a wrong destination. It is thus better for a user to check information concerning the destination (a telephone number or an email address, for example) before sending data from the image processing apparatus 100 to the destination. In contrast, in the case of copying or printing, even if the user executes processing with wrong settings, printing is performed within the image processing apparatus 100, and data is not sent to another apparatus.

Then, when sending processing from the image processing apparatus 100 to another apparatus is performed, the app display time is set to be longer than that when sending processing is not performed (when printing processing is performed, for example). In other words, when sending processing from the image processing apparatus 100 to another apparatus is performed, a certain length of time is added to a standard value. As the app display time, for example, "five seconds" are set for copying, while "ten seconds" are set for fax sending.

However, if the image processing apparatus 100 is installed in a public place and a user has to pay for each use of the image processing apparatus 100, the app display time may be set to be longer even for copying and printing.

In the case of scanning, for example, an image of data to be sent from the image processing apparatus 100 to another apparatus may be displayed as a preview screen. In this case, a destination may be displayed in the preview screen, and canceling of processing may be accepted. If a screen for accepting canceling of processing is displayed after processing of a one touch app has started, the app display time may be set to be shorter than that when such a screen is not displayed. For example, "two seconds" are subtracted from the standard value of the app display time.

The app display time may be calculated based on items of settings (the content of settings) set for executing processing of a one touch app.

As more items of settings are displayed on the app content screen, a user may probably need more time to check the content of processing. As more items of settings will be displayed, the app display time may be set to be longer. If five or more items of settings, for example, are displayed, "five seconds" are added to the standard value of the app display time.

If an item of setting that is likely to take a long time for a user to check is included in the app content screen, the app display time may be set to be longer. In other words, as a greater amount of information will be displayed on the app content screen, the app display time may be set to be longer. Email addresses and telephone numbers, for example, have many characters, and it may probably take a long time to check. If an item of setting to be displayed has more than ten characters, "five seconds" are added to the standard value of the app display time.

Among items of settings for a one touch app, as more items of settings have been changed from standard settings for a standard app, the app display time may be set to be longer. Usually, concerning each item of setting for a standard app, a standard setting is set in advance. If five or more items of settings for a one touch app have been changed from standard settings for a standard app, "five seconds" are added to the standard value of the app display time.

The app display time may be calculated based on the importance of an item of setting. As stated above, if data is sent to another apparatus, a user is required to pay attention not to send the data to a wrong destination. Information concerning a destination thus has higher importance. If information concerning a destination of data is included in items of settings, the app display time may be set to be longer than that when such information is not included. If the destination of data is addressed to outside a company (outside an organization to which the image processing apparatus 100 belongs), the app display time may be set to be even longer.

Calculating of the initial value of the app display time based on information concerning a user using a one touch app will now be described.

As user information, the age of a user or whether the user is physically impaired may be used. If the user is elderly, in other words, if the user reaches a certain age, the user may probably take a long time to check the content of a one touch app. If the user reaches a certain age, the app display time may be set to be longer than that when the user is younger than the certain age. As the age of the user is older, the app display time may be set to be longer. If the user is visually impaired, the app display time may be set to be longer than that when the user is not visually impaired.

User information is registered by a user in advance. The display time calculator 103 then calculates the app display time by referring to the registered user information concerning a user logged in.

The display time calculator 103 may calculate the initial value of the app display time by using information other than the content of processing to be executed by a one touch app and the information concerning a user using the one touch app.

For example, different app display times may be set for a public app and a private app. The public app is a one touch app created by a user other than a user logged in, and is shared among users. The private app is a one touch app created by a user logged in. The public app is not an app created by a user logged in, and it may probably take more time for this user to check the content of the one touch app. The private app is an app created by a user logged in, and it may probably take less time for this user to check the content of the one touch app. The app display time for a public app may thus be set to be longer than that for a private app.

Calculating of the app display time for a one touch app when a user executes this one touch app for the second or subsequent time will now be discussed below. In this exemplary embodiment, a situation where a user has used a one touch app can also be considered as an example of information concerning the user.

If a user has used a certain one touch app frequently in the past, the user may probably accustomed to using this one touch app, and may not need a long time to check the content. If a user has used a one touch app more frequently, the app display time may be set to be shorter. More specifically, when the user uses a one touch app for the second or subsequent time, the app display time may be set to be shorter than that when the user uses the one touch app for the first time.

If a user has canceled processing of a one touch app more frequently in the past, the app display time may be set to be longer. If a user has selected a start button more frequently in the past while counting down the app display time, the app display time may be set to be shorter. The start button is a button for starting processing of a one touch app before the app display time elapses. If errors have occurred more frequently in the past while a user is using a one touch app, the app display time may be set to be longer.

When a one touch app is executed for the first time after settings for this one touch app have been changed, information that the settings have been changed may be displayed on the app content screen, and the app display time may be set to be longer. In this case, the app display time may temporarily be returned to the initial value, or an extra time may be added to the previous app display time. Examples of settings for a one touch app that may be changed are, in addition to the above-described various items of settings, the network environments between the image processing apparatus 100 and another apparatus, a telephone line used for fax sending, sheets in a tray, and whether a post-processing device (finisher) for performing post-processing for printed sheets is provided.

If the consumables used in the image processing apparatus 100 become lower than a predetermined amount, information that consumables are becoming low may be displayed on the app content screen, and the app display time may be set to be longer. In this case, the app display time may temporarily be returned to the initial value, or an extra time may be added to the previous app display time.

When a one touch app is executed for the first time after the position of the one touch selection button 22 for this one touch app on the menu screen 21 is changed, it is possible that the user select a wrong one touch selection button 22. The app display time may thus be set to be longer. In this case, the app display time may temporarily be returned to the initial value, or an extra time may be added to the previous app display time.

In the case of copying or scanning performed by using a one touch app, if a document to be read is not set, a user needs time for setting the document. The app display time may thus be set to be longer by adding a certain time to the initial value, for example.

If a user selects a one touch selection button 22 shortly after the menu screen 21 is displayed (after the user logs in), the user may probably be accustomed to executing this one touch app. The app display time may thus be set to be shorter by subtracting a certain time from the initial value, for example.

In this manner, the display time calculator 103 calculates the app display time by using at least one of the above-described various calculation procedures. When calculating the app display time by combining plural calculation procedures, the display time calculator 103 calculates the app display time by adding or subtracting a certain time to or from the standard value or the initial value according to each calculation procedure. If the calculated app display time is 0 seconds or shorter, the app content screen is not displayed, and processing of the one touch app is immediately executed.

In the above-described examples, the initial value of the add display time is first calculated based on at least one of various items of information, and then, the app display time for the second or subsequent time is calculated by adding or subtracting a certain time to or from the initial value. In this case, each of the initial value of the app display time and the app display time for the second or subsequent time may be calculated by using (combining) the above-described calculation procedures in any manner.

(App Management Table)

The app management table will be described below. FIGS. 4A and 4B illustrate examples of items of information included in the app management table. As items of information shown in FIG. 4A, "name", "processing content", "application type", and "app ID" are included for each application.

"Name" is the name of an application. The name is appended to a selection button 22 and is displayed on the operation panel 130. The names of applications shown in FIG. 4A are those associated with the selection buttons 22 arranged on the menu screen 21 shown in FIG. 2.

"Processing content" is the content of processing to be executed by the application. The example shown in FIG. 4A shows that the contents of processing of the applications "Copy", "FAX", "Scan To", "John's Copy", and "ID Card Copy" are "copy", "fax", "scan", "copy", and "copy", respectively.

"Application type" indicates whether the type of application is a standard app or a one touch app. In the example shown in FIG. 4A, the applications "Copy", "FAX", "Scan To", and "ID Card Copy" are standard apps, while "John's Copy" is a one touch app.

"App ID" is an ID for uniquely identifying an application. Different numbers, such as "1" and "2", are appended to applications.

Concerning the one touch apps, in addition to the items of information shown in FIG. 4A, items of information shown in FIG. 4B are registered. More specifically, "setting items", "app display time", and "parent app ID" are also registered.

"Setting items" indicate the contents of settings set for a one touch app. In the example shown in FIG. 4B, concerning "John's Copy", the contents of settings for copying are indicated. More specifically, the contents of items of settings "color mode", "double-sided/single-sided", "tray number", "the number of copies", "enlargement/reduction", and "sheet size" are indicated. The tray is a feeder for feeding sheets. The tray number is the number assigned to each tray (feeder).

In FIG. 4A, the contents of settings for standard apps are not shown. For standard apps, standard settings are registered in advance. More specifically, for a standard app "Copy", standard settings are set in advance for "color mode", "double-sided/single-sided", "tray number", "the number of copies", "enlargement/reduction", and "sheet size".

In FIG. 4B, "App display time" indicates the app display time calculated for a one touch app. The initial value of the app display time or the updated value based on the initial value calculated as described above is stored.

"Parent app ID" is information indicating based on which standard app a one touch app has been created. The app ID of a standard app used for creating a one touch app is registered.

In this app management table, information concerning each of the standards app is registered when the image processing apparatus 100 is shipped or a standard app is installed in the image processing apparatus 100. Information concerning the one touch app is registered when it is created.

(Flowchart of Execution Procedure of One Touch App)

Figure 5:
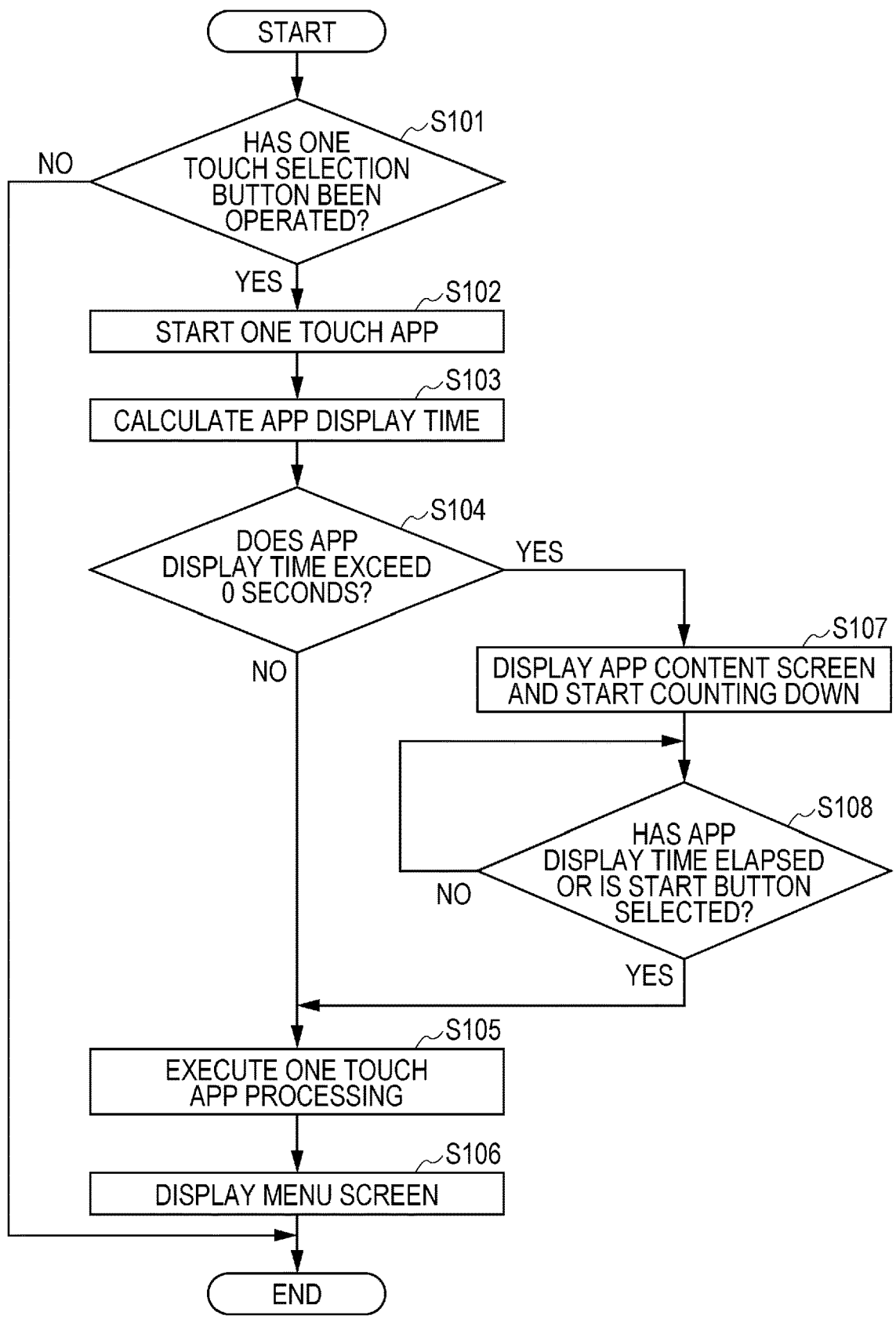
FIG. 5 is a flowchart illustrating an example of the execution procedure of a one touch app.

An example of the execution procedure of a one touch app will now be described below with reference to the flowchart of FIG. 5. Processing shown in FIG. 5 is repeatedly executed. At the start of processing, the menu screen 21 has been displayed.

In step S101, the operation receiver 101 determines whether an operation for selecting a one touch app on the menu screen 21 has been received. If the result of step S101 is NO, the execution processing is terminated. If the result of step S101 is YES, the processing execution controller 105 starts the selected one touch app in step S102.

Then, in step S103, the display time calculator 103 calculates the app display time for the selected one touch app. If the one touch app is executed for the first time after it has been created, the display time calculator 103 calculates the initial value of the app display time. If the one touch app is executed for the second or subsequent time, the display time calculator 103 obtains the value of the app display time stored in the app management table and updates it.

Then, in step S104, the display controller 102 determines whether the calculated app display time exceeds 0 seconds. If the result of step S104 is NO, the processing execution controller 105 executes processing of the one touch app in step S105. In this case, the app content screen is not displayed. Then, in step S106, the display controller 102 redisplays the menu screen 21. The execution processing is then completed.

If the result of step S104 is YES, the display controller 102 displays the app content screen and also starts counting down in step S107. Then, in step S108, the display controller 102 determines whether the app display time has elapsed after it has started counting down or whether the start button has been selected.

If the result of step S108 is NO, step S108 is repeated. The result of step S108 becomes NO in a case in which the app display time has not elapsed after the display controller 102 has started counting down nor has the start button been selected. If the result of step S108 is YES, the process proceeds to step S105 in which processing of the one touch app is executed. The result of step S108 becomes YES in a case in which the app display time has elapsed after the display controller 102 has started counting down or the start button has been selected.

(Sequence Chart of Execution Procedure of One Touch App)

FIG. 6 is a sequence chart illustrating an example of the execution procedure of a one touch app. Processing shown in FIG. 6 is repeatedly executed.

As a result of a user logging in by inputting a user ID and a password, in step S201, the display controller 102 displays the menu screen 21 on the operation panel 130. Then, upon receiving an operation for selecting a one touch selection button 22, in step S202, the operation receiver 101 requests the processing execution controller 105 to start the one touch app. In step S203, the processing execution controller 105 starts the one touch app. The processing execution controller 105 instructs the display time calculator 103 to calculate the app display time.

Then, in step S204, the display time calculator 103 calculates the app display time for the selected one touch app. If the one touch app is executed for the first time after it has been created, the display time calculator 103 calculates the initial value of the app display time. If the one touch app is executed for the second or subsequent time, the display time calculator 103 obtains the value of the app display time stored in the app management table and updates it. The display time calculator 103 then informs the display controller 102 of the calculated app display time.

Then, in step S205, the display controller 102 starts to display the app content screen for the selected one touch app, and also starts counting down. If the display controller 102 determines in step S206 that the app display time has elapsed after it has started counting down or that the user has selected the start button, it requests the processing execution controller 105 to execute the one touch app.

Upon receiving a request from the display controller 102, in step S207, the processing execution controller 105 executes the one touch app. If the one touch app selected by the user is the "John's Copy" one touch app, the processing execution controller 105 provides an instruction to start a job to the image reader 140 and the image forming unit 150. This instruction is generated based on the specific settings set for the one touch app.

Upon receiving the instruction to start a job from the processing execution controller 105, in step S208, the image reader 140 and the image forming unit 150 execute image processing indicated by the instruction. Upon completion of the image processing in step S209, the image reader 140 and the image forming unit 150 inform the display time calculator 103 of processing results.

In step S210, the display time calculator 103 calculates the app display time based on the received processing results. More specifically, the display time calculator 103 updates information concerning the usage situation of the one touch app (usage history), such as the number of times the one touch app has been used, based on the received processing results. The display time calculator 103 then calculates the app display time based on the updated information. The value of the calculated app display time is stored in the app management table. The execution processing shown in FIG. 6 is then completed.

(Specific Example of Execution Processing for One Touch App)

Figure 7A:
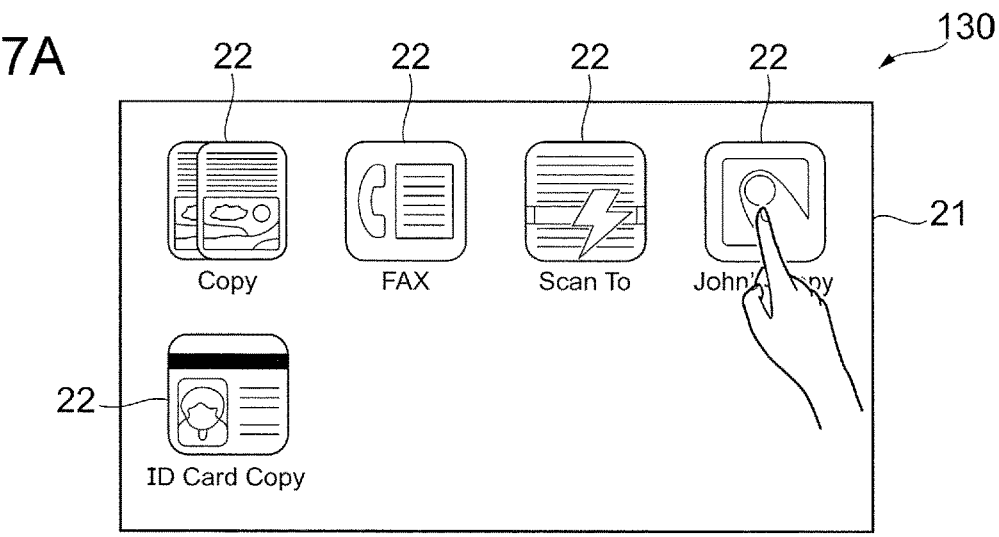
FIGS. 7A through 7C are views for explaining a specific example of execution processing for a one touch app.
Figure 7B:
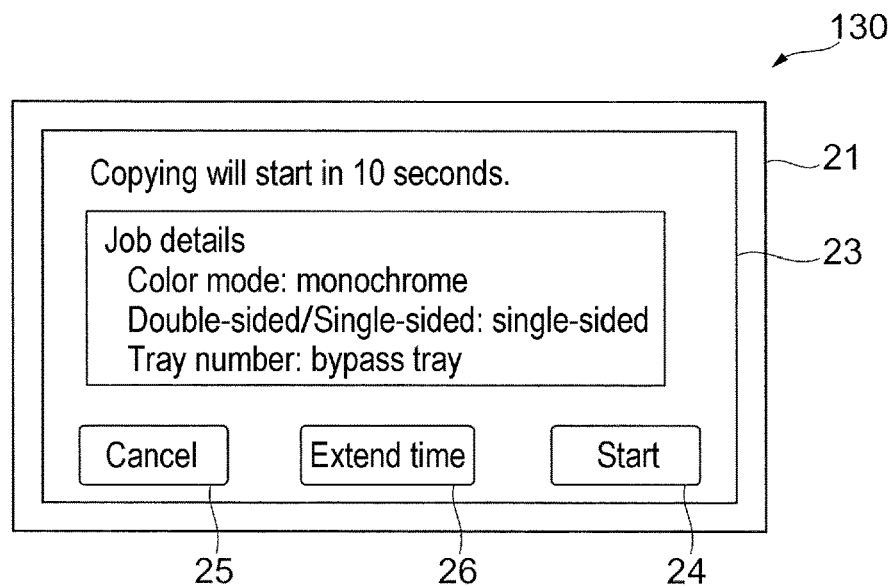
Figure 7C:
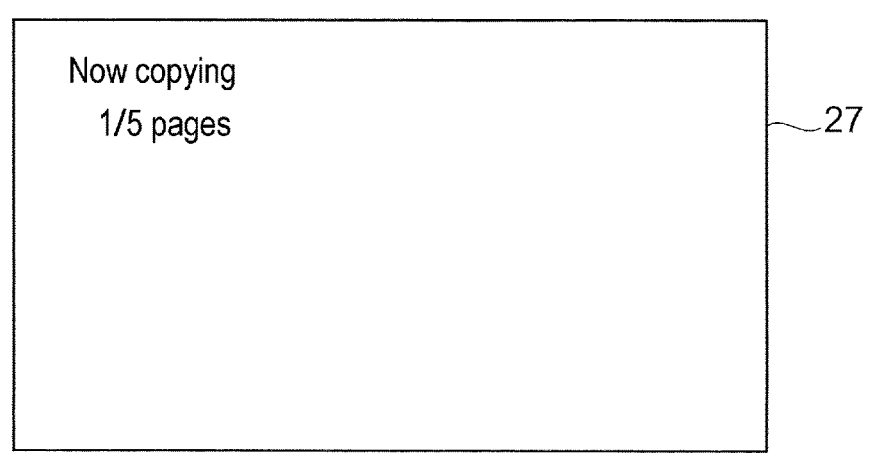

Execution processing for a one touch app will be described below through illustration of a specific example. FIGS. 7A through 7C illustrate a specific example of execution processing for a one touch app. In this example, the menu screen 21 shown in FIG. 2 is displayed on the operation panel 130.

As shown in FIG. 7A, a user performs a selecting operation for selecting the "John's Copy" selection button 22 on the menu screen 21. The "John's Copy" selection button 22 is a one touch selection button 22. Then, an app content screen 23 shown in FIG. 7B is displayed.

On the app content screen 23, the content of the "John's Copy" one touch app is displayed. In the example shown in FIG. 7B, as the contents of the items of settings for this one touch app, "color mode" is "monochrome", "double-sided/single-sided" is "single-sided", and "tray number" is "bypass tray". The user has selected in advance which items of settings would be displayed on the app content screen 23. In this example, the user has selected three items of settings "color mode", "double-sided/single-sided", and "tray number".

The display time calculator 103 calculates the app display time to "ten seconds", based on information that the content of processing for the "John's Copy" one touch app is "copy", the type of application is a private app, and this one touch app has been used for more than ten times. Then, a message "copying will start in 10 seconds" is displayed.

The display controller 102 starts counting down and decreases the remaining time by seconds before copying starts. For example, the display controller 102 displays a message "copying will start in 9 seconds" in one second after it has started to display the app content screen 23. Counting down of the remaining time is stopped while the user is performing an operation on the app content screen 23 (such as scrolling).

After the lapse of ten seconds after the display controller 102 has started to display the app content screen 23, the processing execution controller 105 executes processing of the one touch app. If the user selects a start button 24 before ten seconds elapses, the processing execution controller 105 also executes processing of the one touch app. After processing of the one touch app has started, an execution screen 27 is displayed indicating that the one touch app is being executed, as shown in FIG. 7C. The execution screen 27 shown in FIG. 7C indicates that the first page of a total of five pages is now being copied.

As shown in FIG. 7B, a cancel button 25 and a time extension button 26 are also displayed on the app content screen 23. The cancel button 25 is a button for canceling (stopping) the processing of a one touch app. More specifically, when the user selects the cancel button 25, the app content screen 23 disappears, and processing of the one touch app is terminated. Then, the menu screen 21 is redisplayed. The time extension button 26 is a button for extending a period of time before starting to execute processing of a one touch app. More specifically, when the user selects the time extension button 26, a period of time before starting to execute processing of a one touch app is extended for ten seconds, for example. If the remaining time before starting to execute processing of a one touch app is five seconds, for example, it is extended to fifteen seconds as a result of the user selecting the time extension button 26.

In this example, items of information to be displayed on the app content screen 23 are selected by a user in advance. Alternatively, all items of settings set for a one touch app may be displayed. In the case of the "John's Copy" one touch app, all the items of settings "color mode", "double-sided/single-sided", "tray number", "the number of copies", "enlargement/reduction", and "sheet size" shown in FIG. 4B may be displayed.

Items of settings different from those for a parent app may be displayed. For the "Copy" standard app, standard settings are set in advance for "color mode", "double-sided/single-sided", "tray number", "the number of copies", "enlargement/reduction", and "sheet size". Among these items of settings, if only the setting of "sheet size" is different between the "John's Copy" one touch app and the "Copy" standard app, and more specifically, if "A4", which is the standard setting, is set for the "Copy" standard app and "A3" is set for the "John's Copy" one touch app, "sheet size: A3" is displayed on the app content screen 23 as the item of setting different from that for the parent app.

Items of settings different from those for another one touch app may be displayed. It is now assumed that a "My Copy" one touch selection button 22 is located near the "John's Copy" one touch selection button 22 (in other words, within a predetermined range) on the menu screen 21. The "My Copy" one touch app, as well as the "John's Copy" one touch app, has been created based on the "Copy" parent app. Among the items of settings "color mode", "double-sided/single-sided", "tray number", "the number of copies", "enlargement/reduction", and "sheet size", only the item of setting "color mode" is different between the "John's Copy" one touch app and "My Copy" one touch app. More specifically, as "color mode", "monochrome" is set for the "John's Copy" one touch app, while "color" is set for the "My Copy" one touch app. In this case, "color mode: monochrome" is displayed on the app content screen 23 as the item of setting different from that for another one touch app.

Items of settings for a one touch app different from those for another one touch app created by the same user may be displayed. For example, the user created "John's Copy" one touch app has also created a "Copy1" one touch app. The "Copy1" one touch app, as well as the "John's Copy" one touch app, has been created based on the "Copy" parent app. The item of setting different between the "John's Copy" one touch app and the "Copy1" one touch app is displayed on the "John's Copy" app content screen 23.

As described above, in the image processing apparatus 100 of this exemplary embodiment, in response to a selecting operation for a one touch selection button 22, an app content screen is displayed. Then, after the lapse of an app display time after the app content screen has been displayed, without a user performing any operation, the app content screen automatically disappears, and processing associated with the one touch selection button 22 is executed. That is, when a user selects a one touch selection button 22, an app content screen is displayed, and processing associated with the one touch selection button 22 is executed. In other words, to execute processing of a one touch app, the user does not have to perform any operation other than selecting of a one touch selection button 22.

A user is able to identify more easily what kind of processing will be executed by a one touch app than when the content of processing of a one touch app is not displayed. The user does not have to perform any operation other than selecting of a one touch selection button 22, thereby enhancing the ease of operation for the user.

In this exemplary embodiment, the app content screen is displayed when a user presses a one touch selection button on the screen. However, the app content screen may be displayed in response to an operation other than pressing of a one touch selection button, such as in response to a predetermined operation. For example, the app content screen may be displayed when a user passes a finger over a one touch selection button 22. The app content screen may be displayed when a user looks at a one touch selection button 22 or says the name of a one touch app to a microphone.

In this exemplary embodiment, after a user has selected a one touch selection button 22, the user may cancel processing of the one touch app by using the cancel button on the app content screen. However, the user may not be able to select the cancel button before the app display time elapses. A different approach may be taken which makes a user cancel processing of a one touch app more easily than by selecting of the cancel button while the app display time is being displayed.

For example, the user may cancel processing of a one touch app by touching the operation panel 130. In other words, upon detecting that the user has touched any portion on the operation panel 130, the image processing apparatus 100 may accept canceling of processing of a one touch app.

Alternatively, the image processing apparatus 100 may include a voice detector. Upon detecting predetermined voice while the app display time is being displayed, the image processing apparatus 100 may accept canceling of processing of a one touch app.

In this exemplary embodiment, the app content screen is displayed during a period of the app display time calculated by the display time calculator 103. However, the app content screen may be displayed while a user is selecting a one touch selection button 22. More specifically, the app content screen may be displayed while the user is touching the operation panel 130 with a finger until the user releases it. Upon releasing a finger off the operation panel 130, processing of the one touch app is executed. In this case, the user may perform a flick operation instead of a single-tapping operation. A flick operation is an operation for touching the screen with a finger and then swiping the finger off the screen.

(Application of Exemplary Embodiment to Computer)

Figure 8:
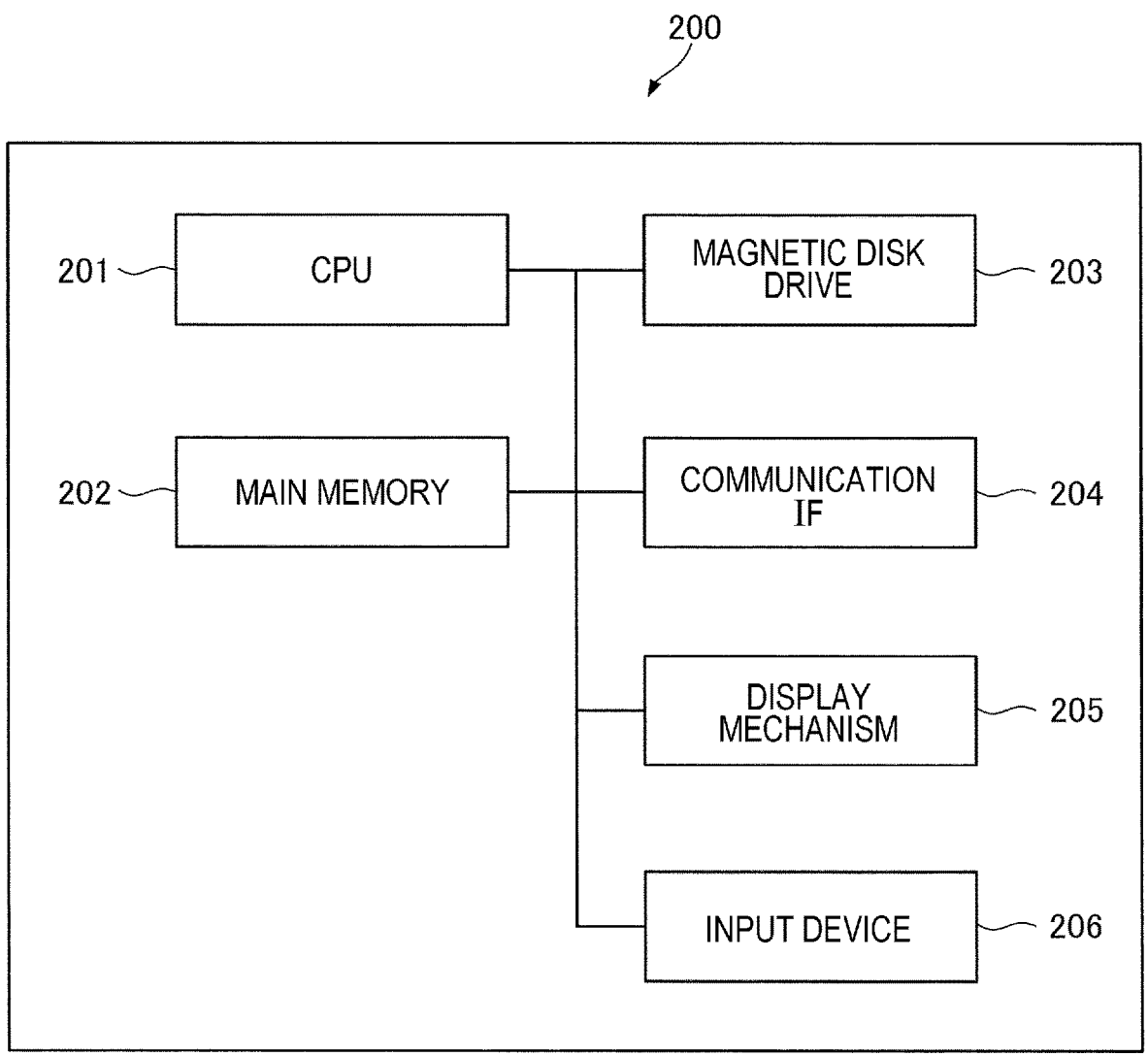
FIG. 8 is a block diagram illustrating an example of the hardware configuration of a computer to which the exemplary embodiment is applicable.

Processing performed by the image processing apparatus 100 of this exemplary embodiment may be executed by using a computer, such as a personal computer (PC), a smartphone, and a cellular phone. An example of the hardware configuration of a computer 200 to which this exemplary embodiment is applicable will be described below with reference to FIG. 8. In this exemplary embodiment, the computer 200 is used as an example of an information processing apparatus.

The computer 200 includes a CPU 201, which is a processor, a main memory 202, and a magnetic disk drive (HDD) 203, which are storage units. The CPU 201 executes various programs, such as an OS and applications. The main memory 202 is a storage region storing various programs and data used for executing the programs. The magnetic disk drive 203 stores a program for implementing the functions of the image processing apparatus 100 shown in FIG. 3. As a result of the CPU 201 loading this program into the main memory 202 and executing processing based on this program, the functions are implemented.

The computer 200 also includes a communication IF 204 for communicating with external sources, a display mechanism 205, such as a video memory and a display, and an input device 206, such as a keyboard and a mouse.

More specifically, as a result of the CPU 201 reading a program for implementing the operation receiver 101, the display controller 102, the display time calculator 103, and the processing execution controller 105 from the magnetic disk drive 203 into the main memory 202 and executing the program, these functional elements are achieved. The app management table storage unit 104 is implemented by the magnetic disk drive 203, for example.

The program for implementing an exemplary embodiment of the invention may be provided via a communication medium or via a recording medium, such as a compact disc—read only memory (CD-ROM), by storing the program therein.

The present invention may be achieved by combining the above-described exemplary embodiment and modified examples.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display that displays a first display screen having a button for receiving an instruction to execute predetermined processing assigned to the button, at least part of information concerning the predetermined processing being not appended to the button; and
   a processor configured to act as a processing execution unit that, when the button is selected by a user, controls the display to display a second display screen having associated information associated with the button and to continue to display the associated information for a predetermined time,
   wherein the second display screen includes a start key, an extended time key, and the associated information associated with the button,
   wherein when the start key is selected by the user, the processing execution unit immediately executes the predetermined processing assigned to the button, wherein when the extended time key is selected by the user, the processing execution unit extends the predetermined time and executes the predetermined processing assigned to the button after the extended predetermined time expires, wherein when no key is selected by the user within the predetermined time, the processing execution unit is configured to subsequently directly execute the predetermined processing assigned to the button, wherein the predetermined time is set taking into consideration an amount of the associated information provided on the second display screen, wherein the predetermined time is set to be relatively longer when a relatively larger amount of the associated information is provided on the second display screen, wherein the associated information is information including setting parameters for the predetermined processing assigned to the button, and wherein the predetermined time is set taking into consideration whether the application is a public application or a private application, the predetermined time set to be longer when the application is the public application than when the application is the private application.

2. The information processing apparatus according to claim 1, wherein the predetermined time is different for each predetermined processing which is executed in response to an instruction to execute the predetermined processing.

3. The information processing apparatus according to claim 2, wherein, if the button receives an instruction to send data from the information processing apparatus to another apparatus, a specific length of time is added to the predetermined time.

4. The information processing apparatus according to claim 1, wherein the predetermined time is set taking into consideration characteristics of the user.

5. The information processing apparatus according to claim 4, wherein the predetermined time is set taking into consideration a situation where the user has selected the button in the past.

6. The information processing apparatus according to claim 4, wherein the predetermined time is set taking into consideration age and/or visual impairment characteristics of the user.

7. The information processing apparatus according to claim 1, wherein the processing execution unit cancels execution of the predetermined processing upon detecting that a user has touched any portion on a display screen during a length of the predetermined time.

8. The information processing apparatus according to claim 1, wherein the predetermined time is set taking into consideration a location and payment requirement of the information processing apparatus.

9. An image processing apparatus comprising:
an image processor that executes image processing;
a display that displays a first display screen having a button for receiving an instruction to execute predetermined image processing assigned to the button, at least part of information concerning the predetermined processing being not appended to the button; and
a processor configured to act as a processing execution unit that, when the button is selected by a user, controls the display to display a second display screen having associated information associated with the button and to continue to display the associated information for a predetermined time, wherein the second display screen includes a start key, an extended time key, and the associated information associated with the button, wherein when the start key is selected by the user, the processing execution unit immediately executes the predetermined image processing assigned to the button, wherein when the extended time key is selected by the user, the processing execution unit extends the predetermined time and executes the predetermined image processing assigned to the button after the extended predetermined time expires, wherein when no key is selected by the user within the predetermined time, the processing execution unit is configured to subsequently directly execute the predetermined image processing assigned to the button, wherein the predetermined time is set at least based upon an amount of the associated information provided on the second display screen, wherein the predetermined time is set to be relatively longer when a relatively larger amount of the associated information is provided on the second display screen, wherein the associated information is information including setting parameters for the predetermined processing assigned to the button, and wherein the predetermined time is set taking into consideration whether the application is a public application or a private application, the predetermined time set to be longer when the application is the public application than when the application is the private application.

10. A non-transitory computer readable medium storing a program causing a computer to execute a process, the process comprising:
outputting data for displaying a button for receiving an instruction to execute predetermined processing assigned to the button on a first display screen, at least part of information concerning the predetermined processing being not appended to the operator; and
starting, when the button is selected by a user, to display associated information associated with the button on a second display screen and continuing to display the associated information for a predetermined time, wherein the second display screen includes a start key, an extended time key, and the associated information associated with the button, wherein when the start key is selected by the user, the predetermined processing assigned to the button is immediately executed, wherein when the extended time key is selected by the user, the predetermined time is extended and the predetermined processing assigned to the button is executed after the extended predetermined time expires, wherein when no key is selected by the user within the predetermined time, the predetermined image processing assigned to the button is subsequently directly executed, wherein the predetermined time is set at least based upon an amount of the associated information provided on the second display screen, wherein the predetermined time is set to be relatively longer when a relatively larger amount of the associated information is provided on the second display screen, wherein the associated information is information including setting parameters for the predetermined processing assigned to the button, and wherein the predetermined time is set taking into consideration whether the application is a public application or a private application, the predetermined time set to be longer when the application is the public application than when the application is the private application.

* * * * *